INVENTOR.
Paul M. Gilfillan,
BY
Cromwell, Greist & Warden
Attys.

Patented June 24, 1947

2,422,725

UNITED STATES PATENT OFFICE 2,422,725

CONTAINER AND SEAM CONSTRUCTION

Paul M. Gilfillan, Mount Vernon, Ohio, assignor, by mesne assignments, to Shellmar Products Corporation, Mount Vernon, Ohio, a corporation of Delaware Application April 11, 1942, Serial No. 438,618

2 Claims. (Cl. 154—116)

This invention relates to improvements in the manufacture of containers and, more particularly, to containers and container-forming materials composed of laminated thermoplastic sheets with marginal unlaminated portions and adapted to be formed into containers having an improved and reinforced seam construction.

The particular type of laminated thermoplastic material involving the present invention is a rubber hydrochloride laminated sheet such as Pliofilm although it will be understood that other types of thermoplastic material such as, for example, Koroseal similarly laminated is also intended within the contemplation of the invention. Such materials have been laminated with a transparency enhancing adhesive and in their laminated forms have provided particularly desirable and useful sheeting combining the characteristics and advantages of single sheets of such material in addition to providing added strengthening qualities as well as clearness, moistureproofing. etc. Large sheets of this laminated material have been sealed marginally together for covering and protecting large commodities such as airplane engines, guns, etc., as well as various smaller types of precision instruments, which substantially eliminates the necessity for swabbing such commodities with films of oil to protect them against corroding and oxidizing effects of the atmosphere. Such laminated materials because of their improved and enhanced characteristics are equally advantageous for use in various fields of the packaging industry where it is desired tightly to wrap and seal food commodities as well as other products. However, a disadvantage has resulted because of the insulating effect of the adhesive medium which is utilized adhesively to affix and laminate the plies of thermoplastic or rubber hydrochloride materials together. This disadvantage occurs in certain areas within the region of the seam after the same has been coalesced or welded together by the application of heat and pressure. Where the seam comes in face-to-face contact the seaming operation adequately effects a coalescence of the material at the marginal portions. But after a period of time, because of stresses and pressures set up within the containers after they have been filled, or even in the application of these covering sheets of materials to the larger devices and instruments as heretofore indicated, it has been found that at the throat of the seam there is a tendency for the material to fracture at the inner ply. When this occurs the marginal seam portions have a further tendency to separate along the adhesive ply resulting in an exposure of the contents and the function of the material is not only impaired but loses its usefulness as a container or protective cover. These as well as other difficulties are overcome by means of the present invention.

A principal object of the invention is the provision of an adhesively laminated container material adapted for heat and pressure seam sealing which will prevent separation along the laminated portions of the seam structure to check any break or fracture of the inner wall along its throat area.

Another object of the invention is to provide container material from adhesively laminated thermoplastic material which has free marginal unlaminated areas and which when brought into superimposed edge alignment can be fused together into a four ply welded seam construction.

A further object of the invention is the provision of blanks of thermoplastic material which are laminated except for their marginal edges and which can be placed in aligned position to effect an improved seam construction and welded so as to form a four ply fused weld as well as a fused marginal weld between the contacting surfaces of the inner sheet of material which is supplemented by the four ply weld to reinforce the same and prevent the separation of the seam if the inner marginal weld should break down and fracture to the adhesively laminated portion.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of the invention, reference should be had to the following detailed description taken in connection with the accompanying drawing, in which.

Figure 1:
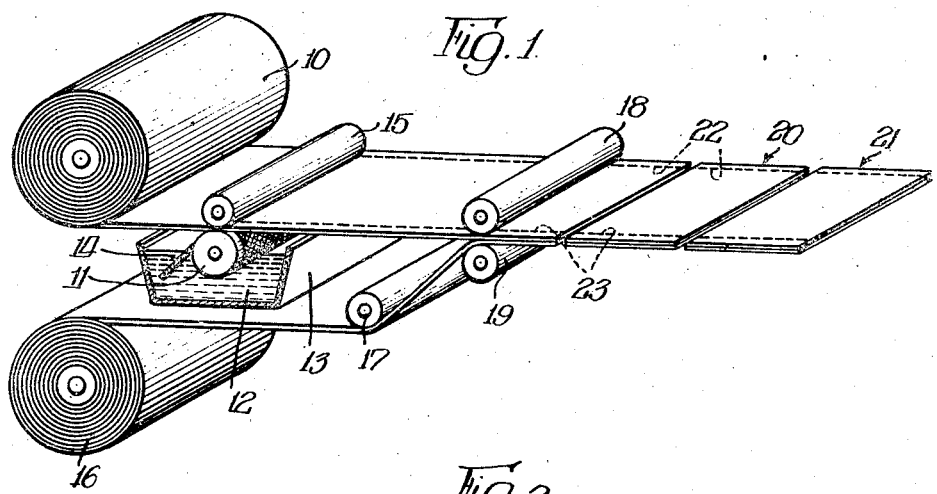
Fig. 1 is a perspective view of a diagrammatic representation of a suitable method for providing laminated webs or blanks of thermoplastic material having free unlaminated edges.

Referring more particularly to Fig. 1 of the drawing, there is shown at 10 an unwinding mill roll of, for example, rubber hydrochloride sheeting to the under surface of which is being applied a suitable type of an adhesive medium by means of an etched roller 11. This etched roller 11 revolves in a bath of the adhesive medium 12 contained in a tank 13 and the amount of the adhesive picked up by the roller is determined by a conventional form of doctor blade 14 which wipes across its surface. It will be noted that the etched roller has a marginally smooth and unetched surface which prevents the application of the adhesive to the under marginal surface of the web. Directly positioned above the etched roller 11 is pressure roller 15 which may be adjusted as an aid to controlling the amount of adhesive which it is desired to apply to the under surface of the web unwinding from the roll 10. A second unwinding mill roll 16 similar to that of roll 10 proceeds around idler roller 17 where it is brought into laminating alignment to the under side of the adhesively coated web coming off the roll 10 and by means of pressure rollers 18 and 19 a laminated web is formed which is cut into blanks 21, for example, by means of a suitable knife (not shown in the interest of clearness of illustration). It will be apparent that because the etched cylinder provides no marginal application to the web from roll 10 there is no adhesive in this area as indicated by the dotted lines 22 and 23 so that while the central area of each blank is adhesively laminated the marginal areas are free and unlaminated.

Figure 2:
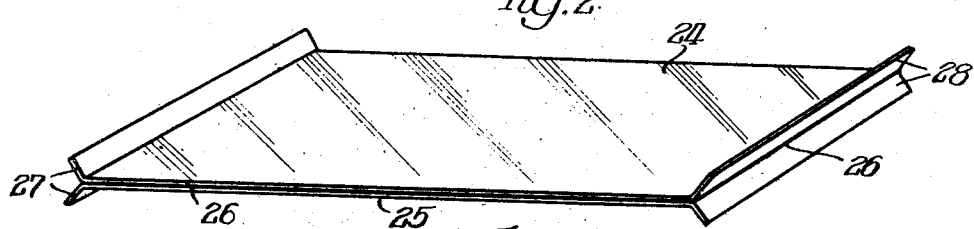
Fig. 2 illustrates one of such adhesively laminated blanks with free unlaminated marginal edges and which is adapted to be sealed to itself or a similar blank to provide a container.

This is more particularly illustrated in Fig. 2 in which the blank so formed is similar to what is shown in Fig. 1 as indicated generally at 20 and 21. The upper laminated layer coming off the mill roll 10 may be referred to as 24 and the lower layer 25, both of which are adhesively affixed to each other by means of adhesive 26 as shown by the heavy lines therebetween. Since, as above indicated, the marginal edge portions have had no adhesive application, they are free and separable as shown at 27 and 28. While but two marginal edges 27, 28 are shown free and unlaminated it is contemplated that one or both of the remaining marginal edges can be left free and unlaminated by withholding application of adhesive from these areas merely by maintaining unetched suitable corresponding portions of the adhesive applying cylinder.

Figure 3:
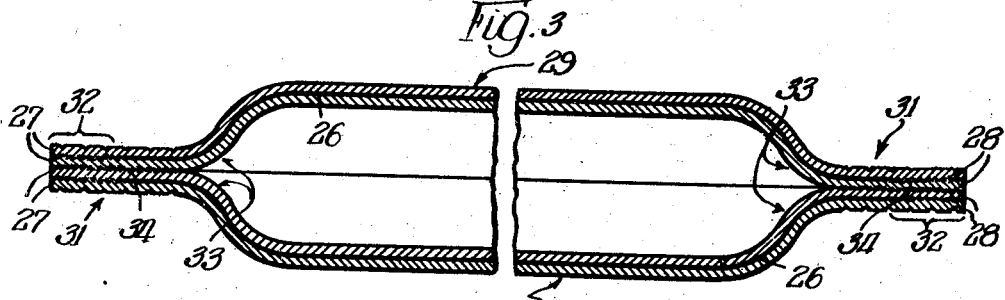
Fig. 3 is a cross sectional view taken through a container with its central portion broken away and formed by superimposing one blank upon another in edge alignment, illustrating a preferred type of seal particularly adaptable for use in certain forms of containers.

Referring now to Fig. 3 there is shown two blanks of such material put in superimposed position and in edge alignment to form a container. A container may also be formed from a single blank by folding the same over to provide a bottom portion and bringing the edges into superimposed alignment. In the former type the formation of a container from at least two blanks of such material would result in a container having its marginal edges sealed around at least three sides thereof before packing whereas in the latter type only two side edges will be formed and the bottom left in its folded position although a seal may also be effected across the bottom if desirable. With either type laminated walls indicated generally at 29 and 30 will terminate into marginal seams also indicated generally at 31, 31. Having been placed in superimposed edge alignment or folded as above indicated, heat and pressure are brought to bear in this area to form the seam. It will be noted in this particular modification (Fig. 3) that the adhesive 26 extends into a portion of the marginally sealed seams but that the free and unlaminated portions 27 and 28 not held together by this adhesive have been fused or coalesced into a welded mass as indicated at 32, 32. The contacting faces of the rubber hydrochloride material, of course, are also fused to form the inner seam and extend from the outer edge to a point equal with the width of the sealing irons and terminate at points forming the throats of the seams as depicted at 33, 33. It is at these points that breakage and fracture most frequently begins. When this occurs the break is inwardly to the adhesive line 26 and not along the fused portion represented by the face-to-face contact of the seam 34. However, while there may be such a break and a consequent separation along the lines of adhesive it is checked at the terminus of the adhesive by virtue of the fact that the four plies of the seam as indicated at 32, 32 have been welded to form a unitary mass. Despite any break which might occur in the container there can be no separation of the walls of the container to endanger its contents.

Figure 4:
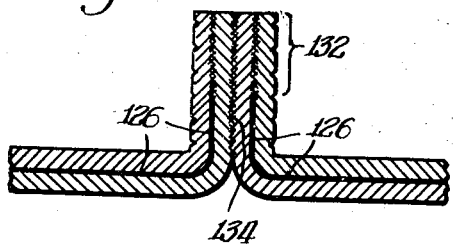
Fig. 4 is an enlarged illustration of a preferred type of seam construction similar to the construction shown in Fig. 3 but preferably utilized in connection with large containers or protective covers.

In Fig. 4 there is illustrated a similar type of seam construction which is used to build up large sized sheets ultimately to be formed, for example, into protective coverings for products and commodities such as those heretofore suggested. While the seam construction is the same the ultimate seam is not allowed to remain in an upstanding position as shown. On the contrary, after the seam has been formed it is folded either to the right or left closely in contact with a wall of an adjacent sheet. Of course, the construction shown is also considerably exaggerated. However, the fused areas 132 and 134 are the same as in Fig. 3 as is also the extension of the adhesive as indicated at 126. The reason for permitting the adhesive to extend beyond the throat of the container and inwardly into the marginally sealed portion is to utilize the particular characteristics of the adhesive to keep the seam in an upstanding position such a seam lends a malleable characteristic to the construction and is therefore more easily handled and worked before and after the seaming operation is complete; and the folding operation is more readily effected because the adhesive tends to keep it in position.

Figure 5:
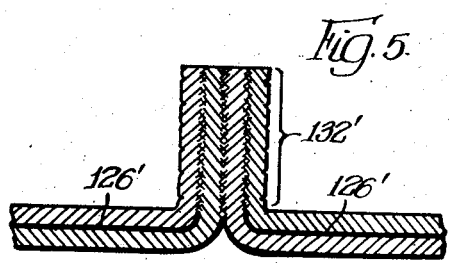
Fig. 5 is a view similar to that depicted in Fig. 4 illustrating a modification thereof.

Fig. 5 illustrates a modification. Here the adhesive 126' does not run into the marginally sealed portion but terminates short thereof in the area of the throat. It will be seen by reference to 132' that the area sealed constitutes a unitary mass throughout and that any breaks along the throat line of the seam will be checked at the termination of the adhesive 126' and the separation of the materials will again be forestalled. This seam has certain added strength characteristics but lacks the same desirable "malleable" features associated with the preferred type of seam. In each case, however, the seam construction is such as to prevent separation thereof.

It will thus be seen that the objects hereinbefore set forth may readily and efficiently be attained and since certain changes in carrying out the above method and certain modifications in the containers as well as its seam construction which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. Wrapping material comprising a plurality of laminated rubber hydrochloride sheets combined marginally into an improved seam construction, said sheets being permanently cemented to each other by a laminating adhesive which extends between the sheets short of their marginal edges, which marginal edges remain free of said adhesive and thus unlaminated to permit their being fused into a unitary mass, said seam construction comprising two of said laminated sheets having said marginal areas defined by said unlaminated portions and lying together to form four layers of unlaminated rubber hydrochloride before said seam construction is completed, and all four layers being fused into a unitary mass to provide said final seam construction with said laminated sheets extending away from each other in opposite directions from the base of said seam construction to provide container walls, whereby separation of the sheets upon breakage can take place in the laminated area only and be permanently checked against separation in the seam construction where the same is fused into said unitary mass.

2. An improved seam construction for use in the manufacture of enlarged container and wrapping materials, which comprises a plurality of sheets of rubber hydrochloride material welded together into a unitary mass along marginal edges and in face-to-face relationship, said sheets being laminated together in pairs by a laminating medium and separately extending away from said seam construction in individual pairs to form container walls, and said laminating medium extending into said welded mass a substantial distance between the edge of said seam construction and the base thereof to lend rigidity to said seam and to prevent seam separation between adjacent lamina.

PAUL M. GILFILLAN.

REFERENCES CITED

The following references are of record in the file of this patent:

UNITED STATES PATENTS

| Number | Name | Date |
| --- | --- | --- |
| 2,282,258 | Snyder | May 5, 1942 |
| 2,200,289 | Moore | May 14, 1940 |
| 2,203,591 | Brown | June 4, 1940 |
| 2,275,063 | Moore | Mar. 3, 1942 |
| 2,297,375 | Vogt | Sept. 29, 1942 |
| 2,149,030 | Moore | Feb. 28, 1939 |
| 2,232,062 | Gurwick | Feb. 18, 1941 |
| 2,232,640 | Schwartzman | Feb. 18, 1941 |